(12) United States Patent
Hollatz

(10) Patent No.: US 7,751,550 B2
(45) Date of Patent: Jul. 6, 2010

(54) METHOD OF PROVIDING STATUS INFORMATION WITHIN AN ACD

(75) Inventor: Mike Hollatz, Huntley, IL (US)

(73) Assignee: Aspect Software, Inc., Lombard, IL (US)

( * ) Notice: Subject to any disclaimer, the term of this patent is extended or adjusted under 35 U.S.C. 154(b) by 1571 days.

(21) Appl. No.: 10/919,194

(22) Filed: Aug. 16, 2004

(65) Prior Publication Data

US 2006/0036607 A1 Feb. 16, 2006

(51) Int. Cl.
*H04M 3/00* (2006.01)
*H04M 5/00* (2006.01)

(52) U.S. Cl. .................................. 379/265.01; 709/227

(58) Field of Classification Search ............ 379/265.01; 709/227
See application file for complete search history.

(56) References Cited

U.S. PATENT DOCUMENTS

| | | | |
|---|---|---|---|
| 5,555,179 A | | 9/1996 | Koyama et al. |
| 5,696,809 A | * | 12/1997 | Voit .................. 379/22.01 |
| 5,703,943 A | * | 12/1997 | Otto .................. 379/265.11 |
| 5,765,033 A | | 6/1998 | Miloslavsky |
| 5,926,539 A | | 7/1999 | Shtivelman |
| 5,946,387 A | | 8/1999 | Miloslavsky |
| 5,953,332 A | | 9/1999 | Miloslavsky |
| 5,953,405 A | | 9/1999 | Miloslavsky |
| 6,002,760 A | | 12/1999 | Gisby |
| 6,021,428 A | | 2/2000 | Miloslavsky |
| 6,044,145 A | | 3/2000 | Kelly et al. |
| 6,044,368 A | | 3/2000 | Powers |
| 6,067,357 A | | 5/2000 | Kishinsky et al. |
| 6,108,711 A | | 8/2000 | Beck et al. |
| 6,138,139 A | | 10/2000 | Beck et al. |
| 6,167,395 A | | 12/2000 | Beck et al. |
| 6,170,011 B1 | | 1/2001 | Beck et al. |
| 6,175,563 B1 | | 1/2001 | Miloslavsky |
| 6,175,564 B1 | | 1/2001 | Miloslavsky et al. |
| 6,185,292 B1 | | 2/2001 | Miloslavsky |
| 6,345,305 B1 | | 2/2002 | Beck et al. |
| 6,373,836 B1 | | 4/2002 | Deryugin et al. |
| 6,389,007 B1 | | 5/2002 | Shenkman et al. |
| 6,393,015 B1 | | 5/2002 | Shtivelman |
| 6,563,816 B1 | | 5/2003 | Nodoushani et al. |
| 6,601,099 B1 | | 7/2003 | Corneliussen |
| 6,718,021 B2 | * | 4/2004 | Crockett et al. .......... 379/93.23 |
| 6,732,156 B2 | | 5/2004 | Miloslavsky |
| 7,139,374 B1 | * | 11/2006 | Scott et al. ............... 379/142.1 |
| 2002/0026527 A1 | | 2/2002 | Das et al. |
| 2002/0103850 A1 | | 8/2002 | Moyer et al. |
| 2002/0186684 A1 | | 12/2002 | Shaughnessy et al. |

(Continued)

FOREIGN PATENT DOCUMENTS

GB  2410650  8/2005

(Continued)

*Primary Examiner*—Quynh H Nguyen
(74) *Attorney, Agent, or Firm*—Husch Blackwell Sanders Welsh Katz

(57) ABSTRACT

A method and apparatus are provided for retrievably storing information within an automatic contact distributor system within a database that is accessible through the Internet. The method includes the steps of saving the information from the automatic call distributor system within the database using a SIP REGISTER message and retrieving the information through the Internet using a SIP SUBSCRIBE message.

26 Claims, 1 Drawing Sheet

U.S. PATENT DOCUMENTS

| | | | |
|---|---|---|---|
| 2004/0133641 A1* | 7/2004 | McKinnon et al. | 709/204 |
| 2005/0141694 A1* | 6/2005 | Wengrovitz | 379/265.09 |

FOREIGN PATENT DOCUMENTS

| | | |
|---|---|---|
| GB | 2 413 238 | 10/2005 |
| WO | WO 03/107575 A2 | 12/2003 |
| WO | WO 2004/030327 | 4/2004 |

* cited by examiner

METHOD OF PROVIDING STATUS INFORMATION WITHIN AN ACD

FIELD OF THE INVENTION

The field of the invention relates to computer systems and more particularly, to automatic call distributors.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to the Internet. The standards that are used for processing switched circuit calls and exchanging control information through the PSTN cannot be used within the Internet. Often the elements of the contact distributor are distributed to geographically diverse locations. As a result, management of resources becomes much more difficult due to the cumulative delays associated with obtaining information from a multiplicity of dedicated information sources through the Internet. Because of the importance of contact centers, a need exists for a method and apparatus for expediting the availability of information from disparate information resources through the Internet.

SUMMARY

A method and apparatus are provided for retrievably providing status information within an automatic contact distributor system within a database that is accessible through the Internet. The method includes the steps of saving the information from the automatic call distributor system within the database using a SIP REGISTER message and retrieving the information through the Internet using a SIP SUBSCRIBE message.

DETAILED DESCRIPTION OF AN ILLUSTRATED EMBODIMENT

Figure 1:
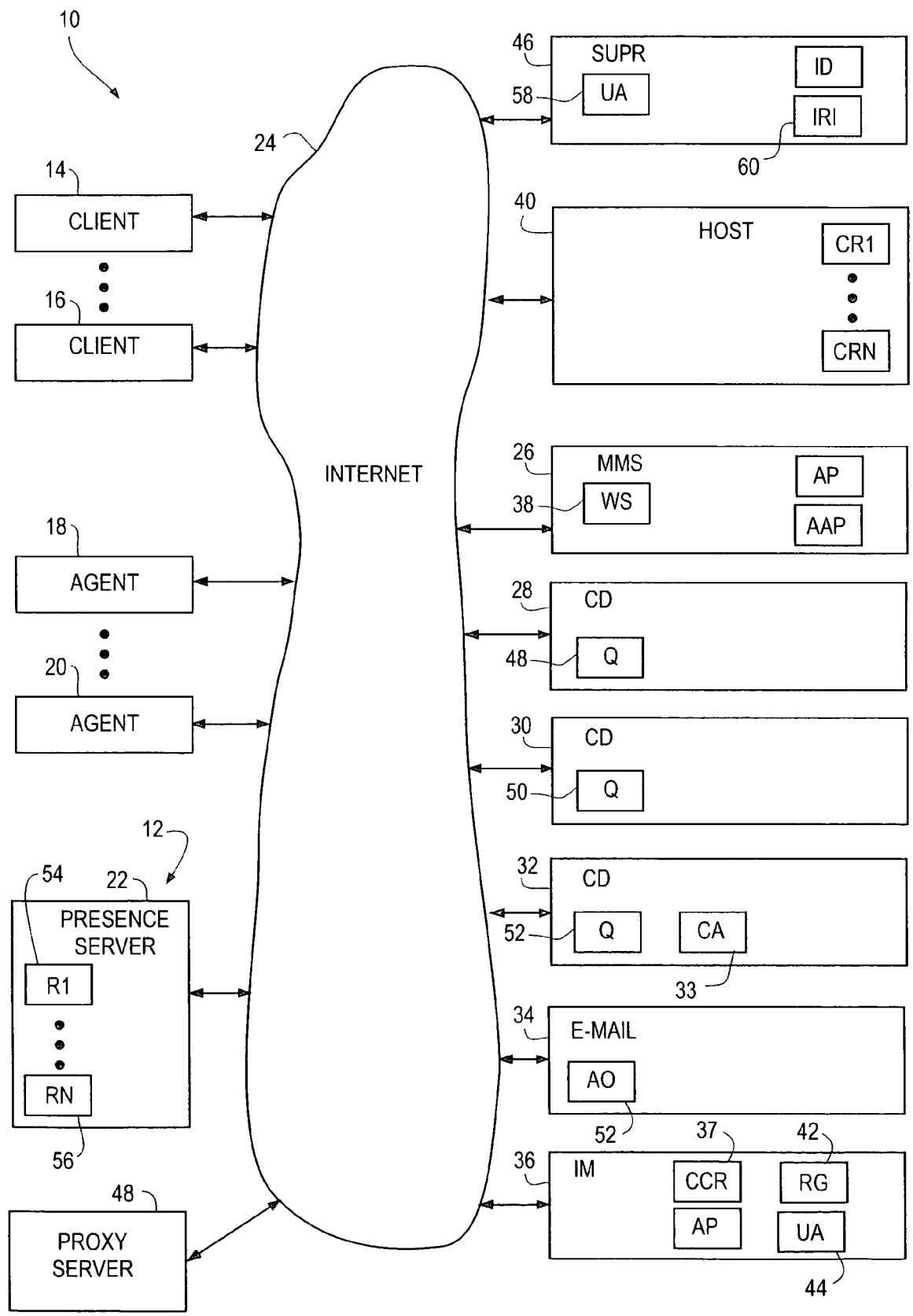
FIG. 1 is a block diagram of a contact distribution system in accordance with an illustrated embodiment of the invention.

FIG. 1 is a block diagram of a contact distribution system 10 shown under an illustrated embodiment of the invention. The contact distribution system may be used for connecting calls through the Internet 24 between clients 14, 16 and agents 18, 20. In general, the system 10 may be used by any of a number of different enterprise organizations (e.g., commercial, environmental, political, etc.) to advance the agenda of the enterprise.

The system 10 may include a number of computer resources 18, 20, 26, 28, 30, 32, 34, 36 that function to form the connections between clients and agents. Shown in FIG. 1 is a data storage system 12 that may be used to accumulate and collect status information regarding operation of the computer resources of the system 10.

As used herein, a computer resource of the organization is a computer application or processor that processes information that is directed related to enterprise operations of the organization. Using the Open Systems Interconnection (OSI) network model, a computer resource is a user application that operates from Layer 7 of the OSI model.

As described below, at least some of the computer resources 18, 20, 26, 28, 30, 32, 34, 36 perform predetermined services for other computer resources in furtherance of enterprise objectives. As used herein, a predetermined service performed by one resource for another means the processing of data to achieve some enterprise result that is not directly related to communication connections through the Internet.

Access to the contact center 10 of the organization by clients 14, 16 of the organization may be provided through the Internet 14 under any of a number of different processes. In order to promulgate the agenda of the organization to its clients 14, 16, the organization may publish contact information (e.g., e-mail addresses, instant message (IM) addresses or universal resource locators (URLs)), by advertising or otherwise, that identifies a communication path to the organization.

Under the illustrated embodiment, the contact distribution system 10 may include one or more servers 26, 34, 36 that may function to receive and initially process calls. A first server 34 may receive calls in the form of e-mails. A second server 36 may receive calls under an Instant Messaging (IM) format. A third multi-mode server 26 may receive calls from one or more webpages downloaded to clients 14, 16 from a website 38 of the multi-mode server 26.

In the case where the organization is a manufacturer with many different products, a different e-mail address may be provided for each different product line. As such, the e-mail server 34 may receive e-mails directed to many different addresses that are all within one or more domain names used by the e-mail server 34. The use of different destination addresses may be used to provide the system 10 with a first level indication of the call type of the received call. The IM server 36 and multi-mode server 26 may be used in a similar manner.

Calls processed by the servers 26, 34, 36 may be initiated in any of a number of different ways. For example, a call from a client 14, 16 to the multi-mode server 26 may be initiated by activation of a SPEAK WITH AGENT softkey on a webpage downloaded from the multi-mode server 26. Alternatively, calls from clients 14, 16 may by initiated in response to pop-up ads posted to websites visited by clients 14, 16. Calls may also be initiated conventionally by a client 14, 16 activating an appropriate application (e.g., Outlook by Microsoft) and entering a Universal Resource Locator (URL)

of the organization under an e-mail or IM format in response to a printed ad in a newspaper or magazine.

Calls from clients 14, 16, received by the servers 26, 34, 36 may be distributed to agents 18, 20 through a number of call distributors 28, 30, 32. As the calls arrive, the server 26, 34, 36 receiving the call may open a file for each call identified by a unique call identifier. The file may include at least a source identifier (e.g., an e-mail address, URL, etc.) of the client 14, 16 originating the call and a destination identifier that identifies the call destination (e.g., e-mail address, URL, etc.) within the system 10. In the case of calls received by the multi-mode server 26, information regarding any webpages visited may also be included within the call file.

A copy of each call file may be transferred to the host 40. Within the host 40, the information within the call file may be used to identify further information about the caller. For example, the source identifier may be used to classify the call as originating from existing or new customers. Information on webpages visited or on prior contacts with the client 14, 16 may be used to provide and locate information regarding the type of call involved.

Any additional information regarding the call may be transferred back to the server 26, 34, 36. Within the server 26, 34, 36, the information within the call file and, possibly, any additional information from the host 26 may be used within a call classification application 37 to further classify the call into one or more call types.

Once a call type has been determined, the server 26, 34, 36 may transfer the call to a call distributor 28, 30, 32. The call distributor 28, 30, 32 that the server 26, 34, 36 selects to handle the call may be based upon availability or upon the call type.

Selection of a contact distributor 28, 30, 32 may be based simply upon status or upon some predetermined criteria. For example, the first call distributor 28 may be associated with agents 18, 20 who are primarily skilled at handling calls of a first call type and who have secondary skills in handling calls of a second type and third call type. Similarly, the second call distributor 30 may be associated with agents 18, 20 who are primarily skilled at handling calls of a second call type and who have secondary skills in handling calls of a first type and third call type and the third call distributor 32 may be associated with agents 18, 20 who are primarily skilled at handling calls of a third call type and have secondary skills in handling calls of a first type and second call type.

As such, calls of the first call type will normally be transferred to the first call distributor 28, calls of the second call type will be transferred to the second call distributor 30 and calls of the third call type will be transferred to the third call distributor 32. However, if one or more of the call distributors 28, 30, 32 is inoperative or otherwise unavailable or is overloaded, then calls may be handled by any other call distributor 28, 30, 32.

If the primary call distributor 28, 30, 32 is available, then the server 26, 34, 36 may transfer the call along with the file to the appropriate server 28, 30, 32. Within the call distributor 28, 30, 32, a call routing application 33 may compare the contents of the call file with a list of agent skills and may assign the call to a qualified agent 18, 20. If an agent is not available, then the agent selection processor may place the call in a call queue 48, 50, 52 pending availability of a qualified agent.

Turning now to the apparatus 12 for storing status information, an explanation will be provided as to how computer resources 18, 20, 26, 28, 30, 32, 34, 36 and 48 function to store status information within a presence server 22. Following the explanation of storage of information, an explanation will be provided as to how information users (e.g. a supervisor terminal 46) retrieves the stored information.

Under illustrated embodiments, each resource 18, 20, 26, 28, 30, 32, 34, 36, 48 may be provided with a reports application 42 and a user agent 44. The reports application 42 may periodically collect reported information from within each resource 18, 20, 26, 28, 30, 32, 34, 36, 48 and format the information for transfer to the presence server 22 within the associated user agent 44.

The presence server 22 may have substantially the same functionality as presence servers defined by the Internet Engineering Task Force (IETF) in RFC #3261 for use in the context of Session Initiation Protocol (SIP). As such, the presence server 22 functions to receive and save SIP REGISTRATION messages (as defined by RFC #3261) for the benefit of subscribers (as also defined by RFC #3261).

In this regard, the reporting applications 42 within each resource 18, 20, 26, 28, 30, 32, 34, 36, 48 collects reported information and forwards the collected information to the associated user agent 44. Reported information in the case of the e-mail server 34 may include the number of e-mails per time period and the number of e-mails per e-mail type (e.g, based upon e-mail address or e-mail content, etc.). In the case of the multi-mode server 26, the collected information may include the number of visitors per time period to the website 38, the number of requests for contact with an agent and possibly the number of calls per call type (e.g., based upon the content of the webpages visited). With regard to the contact distributors 28, 30, 32, the reported status information may include the number contacts handled per time period by the contact center 28, 30, 32, the number of calls in each call queue, the average speed of answer and the number of abandoned calls. The reported information from the host 40 may include the overall number of calls handled per time period, the number of new clients, and the subject matter of the contacts. The reported status information from the agents 18, 20 may include sign-in, sign-out information, the number of calls handled per time period and the average length of each call.

Reported information collected by the reporting application 42 may be transferred to the associated user agent 44 where the reported information is encoded into a SIP REGISTER message. In the case of an agent "Mary" working at an agent station (e.g., 18), the SIP REGISTER message may have the format as follows:

REGISTER sip: registrar@callcenter.com SIP/2.0

Contact: sip:Mary@callcenter.com; calls_handled=5; Available=yes; average_talk_time=3:01

Contact-Length=0.

The SIP REGISTER messages from the resources 18, 20, 26, 28, 30, 32, 34, 36, 48 may be received by the register server 22 and saved in a respective file 54, 56 in memory. As each new SIP REGISTER message is received from a resource 18, 20, 26, 28, 30, 32, 34, 36, 48, the information from the new message may be overwritten over the old information. Alternately, a time stamp may be associated with each SIP REGISTRATION message from the respective resources 18, 20, 26, 28, 30, 32, 34, 36, 48 and each message may be saved for some predetermined time period.

From time-to-time, the supervisor 46 may choose to request reported information from the presence server 22. In this regard, the supervisor may enter an identifier of a resource 18, 20, 26, 28, 30, 32, 34, 36, 48 into an information retrieval interface 60 within the supervisors terminal 46. Entry of a resource identifier causes the interface 60 operating in conjunction with the associated user agent 58 to generate a SIP SUBSCRIBE message. In the case of the agent "Mary", the SIP SUBSCRIBE message may have the form as follows:

SUBSCRIBE sip: registrar@callcenter.com SIP/2.0
From: supervisor@callcenter.com
Contact: sip:Mary@callcenter.com; calls_handled; Available; average_talk time
Contact-Length=0.

Alternatively, the contact header of the SIP SUBSCRIBE message may be truncated if the supervisor where to desire some subset of Mary's reported information.

In response, the presence server 22 may respond with a SIP NOTIFY message forwarding the reported information to the supervisors terminal 46. In the case of the agent Mary, the SIP NOTIFY message may have the format as follows:

NOTIFY sip: supervisor@callcenter.com SIP/2.0
Contact: sip:Mary@callcenter.com; calls_handled=5; Available=yes; average_talk_time=3:01
Contact-Length=0.

Using the SIP REGISTER, SUBSCRIBE and NOTIFY messages, the supervisor 46 may obtain reported information from one or more or from all of the resources 18, 20, 26, 28, 30, 32, 34, 36, 48. Further, the supervisor terminal 46 may retrieve the information piecemeal or may subscribe to receive the information on a real-time basis as it is received by the presence server 22.

The use of the SIP REGISTER, SUBSCRIBE and NOTIFY messages allow the reported information to be cached in a system location that is not subject to the reporting difficulties of the information sources. For example, reported information may be forwarded from the resources 18, 20, 26, 28, 30, 32, 34, 36, 48 to the presence server 22 on a regular basis as the reported information is collected at the source.

Once collected, the supervisor may request the information as needed or may activate reporting applications that subscribe and collect the information in real time. Once collected, the reporting applications may provide and maintain an overall view of the contact center 10 that reflects a current agent and call flow state.

A specific embodiment of method and apparatus for storing information regarding the availability of resources of a computer system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of retrievably storing status information within an automatic contact distributor system within a common database that is accessible through the Internet, the automatic contact distributor system including a plurality of automatic contact distributor resources which communicate with each other and with the common database over the internet such method comprising the steps of:

each resource periodically collecting its own status information, and each resource encoding the collected status information into a SIP REGISTER message using SIP CONTACT headers, and sending the SIP REGISTER message from the respective resource via the internet to the common database, and saving the status information from the plurality of resources into the common database, and;

retrieving the status information of a selected resource of the plurality of resources from the database through the Internet by sending a SIP SUBSCRIBE message from at least one of the resources to the common database over the Internet to retrieve the status information.

2. The method of retrievably storing status information within the automatic contact distributor system as in claim 1 further comprising an agent terminal of the automatic call distributor system sending the SIP REGISTER message from the agent terminal to the database.

3. The method of retrievably storing status information within the automatic contact distributor system as in claim 2 wherein the SIP REGISTER message from the agent further comprises one of the group consisting of agent sign-on, agent sign-off, calls handled per hour and average talk time.

4. The method of retrievably storing status information within the automatic contact distributor system as in claim 1 wherein the SIP REGISTER message from the automatic contact distributor further comprises one of the group consisting of calls handled per time period, queue length and abandoned calls per time period.

5. The method of retrievably storing status information within the automatic contact distributor system as in claim 1 further comprising a supervisor of the automatic call distributor sending the SIP REGISTER message from a terminal of the supervisor to the database.

6. The method of retrievably storing status information within the automatic contact distributor system as in claim 5 further comprising the supervisor of the automatic call distributor subscribing to saved information using a SIP EVENT header.

7. The method of retrievably storing status information within the automatic contact distributor system as in claim 6 wherein the information subscribed to further comprises an identifier of an agent and one of group consisting of agent sign-on, agent sign-off, calls handled per hour and average talk time.

8. The method of retrievably storing status information within the automatic contact distributor system as in claim 6 wherein the information subscribed to further comprises an identifier of an automatic contact distributor and one of the group consisting of calls handled per time period, queue length and abandoned calls per time period.

9. An apparatus for retrievably storing status information within an automatic contact distributor system within a common database that is accessible through the Internet, the automatic contact distribution system including a plurality of automatic contact distribution resources coupled to the internet, such apparatus comprising:

means associated with each respective resource for collecting status information of the respective resource and encoding the status information of each respective resource into a respective SIP REGISTER message using SIP CONTACT headers, and for sending the respective SIP REGISTER message from the respective resource;

means for receiving the respective SIP REGISTER messages via the internet and saving the status information from the respective automatic call distributor resources into the common database; and means for retrieving the status information through the Internet by sending a SIP SUBSCRIBE message from at least one of the resources to the database over the Internet to retrieve the status information.

10. The apparatus for retrievably storing status information within the automatic contact distributor system as in claim 9 further comprising means within an agent terminal of the automatic call distributor system for sending the SIP REGISTER message from the agent terminal to the database.

11. The apparatus for retrievably storing status information within the automatic contact distributor system as in claim 10 wherein the SIP REGISTER message from the agent further comprises one of the group consisting of agent sign-on, agent sign-off; calls handled per hour and average talk time.

12. The apparatus for retrievably storing status information within the automatic contact distributor system as in claim 9 further comprising means within an automatic contact distributor of the automatic call distributor system for sending the SIP REGISTER message from the automatic contact distributor to the database.

13. The apparatus for retrievably storing status information within the automatic contact distributor system as in claim 12 wherein the SIP REGISTER message from the automatic contact distributor further comprises one of the group consisting of calls handled per time period, queue length and abandoned calls per time period.

14. The apparatus for retrievably storing status information within the automatic contact distributor system as in claim 9 further comprising means within a supervisor terminal of the automatic call distributor for sending the SIP REGISTER message from a terminal of the supervisor to the database.

15. The apparatus for retrievably storing status information within the automatic contact distributor system as in claim 14 further comprising means within the supervisor terminal of the automatic call distributor for subscribing to saved information using a SIP CONTACT header.

16. The apparatus for retrievably storing status information within the automatic contact distributor system as in claim 15 wherein the information subscribed to further comprises an identifier of an agent and one of group consisting of agent sign-on, agent sign-off, calls handled per hour and average talk time.

17. The apparatus for retrievably storing status information within the automatic contact distributor system as in claim 15 wherein the information subscribed to further comprises an identifier of an automatic contact distributor and one of the group consisting of calls handled per time period, queue length and abandoned calls per time period.

18. An apparatus for retrievably storing status information within an automatic contact distributor system within a common database that is accessible through the Internet, such apparatus comprising:
   a plurality of automatic contact distribution system resources, each respective resource collecting status information of the respective resource, encoding the status information of each respective resource into a respective SIP REGISTER message using SIP CONTACT headers and sending the respective SIP REGISTER messages from the respective resources over the Internet;
   a SIP PRESENCE server that receives the respective SIP REGISTER messages over the Internet and saves the status information into the common database based upon receipt over the Internet of the SIP REGISTER messages; and
   a terminal that retrieves the status information from the common database through the Internet by sending a SIP SUBSCRIBE message over the Internet to the common database.

19. The apparatus for retrievably storing status information within the automatic contact distributor system as in claim 18 further comprising a user agent within an agent terminal of the automatic call distributor system that sends the SIP REGISTER message from the agent terminal to the database.

20. The apparatus for retrievably storing status information within the automatic contact distributor system as in claim 19 wherein the SIP REGISTER message from the agent further comprises one of the group consisting of agent sign-on, agent sign-off, calls handled per hour and average talk time.

21. The apparatus for retrievably storing status information within the automatic contact distributor system as in claim 18 further comprising a user agent within an automatic contact distributor of the automatic call distributor system for sending the SIP REGISTER message from the automatic distributor to the database.

22. The apparatus for retrievably storing status information within the automatic contact distributor system as in claim 21 wherein the SIP REGISTER message from the automatic contact distributor further comprises one of the group consisting of calls handled per time period, queue length and abandoned calls per time period.

23. The apparatus for retrievably storing status information within the automatic contact distributor system as in claim 18 further comprising a user agent within a supervisor terminal of the automatic call distributor for sending the SIP REGISTER message from a terminal of the supervisor to the database.

24. The apparatus for retrievably storing status information within the automatic contact distributor system as in claim 23 further comprising a display application within the supervisor terminal of the automatic call distributor for subscribing to saved information using a SIP contact header.

25. The apparatus for retrievably storing status information within the automatic contact distributor system as in claim 24 wherein the information subscribed to further comprises an identifier of an agent and one of group consisting of agent sign-on, agent sign-off, calls handled per hour and average talk time.

26. The apparatus for retrievably storing status information within the automatic contact distributor system as in claim 24 wherein the information subscribed to further comprises an identifier of an automatic contact distributor and one of the group consisting of calls handled per time period, queue length and abandoned calls per time period.

\* \* \* \* \*